J. E. Stone.

Fly Trap.

No. 87,801.  Patented Mar. 16, 1869.

Witnesses:
S. N. Piper
J. B. Snow

Inventor:
Jonathan E. Stone.
Per. R. H. Eddy
Attorney

JONATHAN E. STONE, OF ERVING, MASSACHUSETTS.

Letters Patent No. 87,801, dated March 16, 1869.

IMPROVED FLY-TRAP.

The Schedule referred to in these Letters Patent and making part of the same.

*To all persons to whom these presents may come:*

Be it known that I, JONATHAN E. STONE, of Erving, of the county of Franklin, of the State of Massachusetts, have invented a new and useful Fly-Trap; and do hereby declare the same to be fully described in the following specification, and represented in the accompanying drawings, of which—

Figure 1:
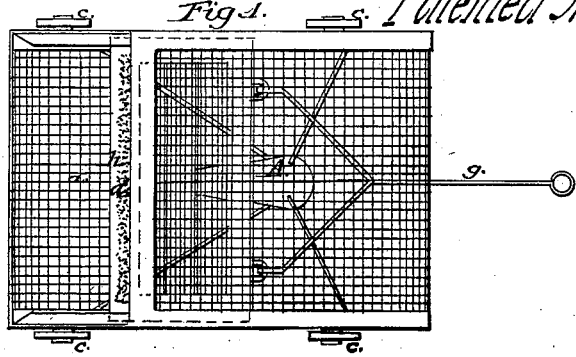
Figure 2:
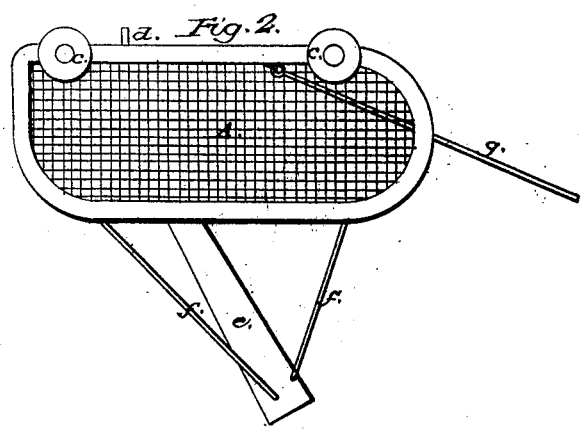

Figure 1 denotes a top view,

Figure 2, a side elevation, and

Figure 3:
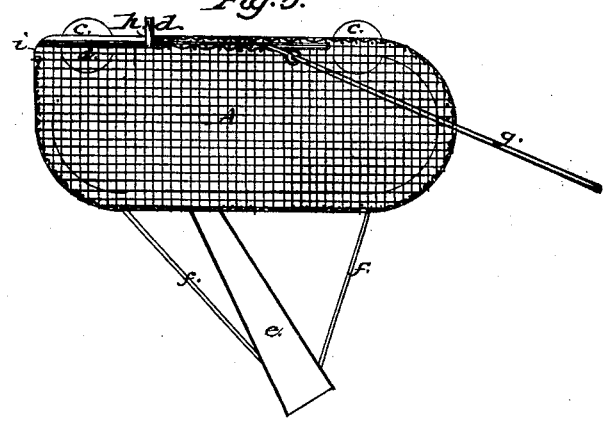

Figure 3, a vertical and longitudinal section of it.

In such drawings—

A denotes a box, which may be composed of a frame, and wire netting, or gauze.

It has an opening, $a$, arranged in its top, near to one end, and to such opening there is a gate or cover, $h$, so applied to the box as to be capable of being slid horizontally thereon, so as to either close or uncover the said opening.

The box has a narrow opening, $i$, or, in other words, the upper edge of the front end of the box is arranged about one-half an inch below the plane of the upper edges of the sides of the box, there being applied to such sides, four wheels, $c\ c\ c\ c$. These wheels extend a short distance above the top of the box.

Furthermore, there is on the top of the cover $h$, and going across it, a flexile lip, $d$, which may be composed of bristles or India rubber, it being placed at the front edge of the said cover $h$, and arranged therewith in manner as represented in the drawings.

A socket-tube, $e$, projects from the bottom of the box, and is secured in position by stays $f$, extending obliquely from it to the box. This socket-tube is to receive a long pole, or handle, by which the fly-trap may be pressed up to, and borne along the ceiling of an apartment.

A rod, $g$, attached to the door or cover $h$, serves to enable a person to close the cover before the trap may be removed from a ceiling, the same being to prevent the escape of the insects which may have been entrapped.

To use the trap, it is to be borne up to a ceiling on which flies or insects may have congregated, the wheels of the trap being in contact with the ceiling. The trap should be moved along on the ceiling, so as to pass underneath the flies, and bring them against the flexile lip $d$, which being in contact with the ceiling, will scrape the flies into the opening of the box.

I claim the fly-trap, made substantially as described, viz, of the box open at top and front, and provided with a slider or cover, a flexile lip, a set of wheels, and a pole-socket, the whole being arranged as specified.

JONATHAN E. STONE.

Witnesses:
R. H. EDDY,
J. R. SNOW.